(12) United States Patent
Huang et al.

(10) Patent No.: US 7,490,966 B2
(45) Date of Patent: Feb. 17, 2009

(54) ILLUMINATION SYSTEM

(75) Inventors: Jia-Bin Huang, Hsinchu (TW);
Chi-Chui Yun, Hsinchu (TW);
Chu-Ming Cheng, Hsinchu (TW);
S-Wei Chen, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 108 days.

(21) Appl. No.: 11/557,972

(22) Filed: Nov. 9, 2006

(65) Prior Publication Data

US 2007/0147064 A1     Jun. 28, 2007

(30) Foreign Application Priority Data

Dec. 27, 2005   (TW) ................ 94146679 A

(51) Int. Cl.
*F21V 7/04*   (2006.01)
(52) U.S. Cl. .............. 362/551; 362/276; 362/583; 362/556; 362/293; 359/234; 359/892
(58) Field of Classification Search ........... 362/276, 362/293, 583, 551, 556, 558, 582, 26; 359/892, 359/583
See application file for complete search history.

(56) References Cited

U.S. PATENT DOCUMENTS

| | | | |
|---|---|---|---|
| 6,773,118 B2 * | 8/2004 | Lee | 353/122 |
| 7,033,031 B2 * | 4/2006 | Hori | 353/99 |
| 7,160,011 B2 * | 1/2007 | Wang | 362/516 |
| 7,287,863 B2 * | 10/2007 | Liang et al. | 353/84 |
| 2002/0018350 A1 * | 2/2002 | Lepley et al. | 362/551 |
| 2005/0213333 A1 * | 9/2005 | Liu | 362/297 |
| 2006/0039153 A1 * | 2/2006 | Gupta | 362/298 |

* cited by examiner

*Primary Examiner*—Ali Alavi
*Assistant Examiner*—Evan Dzierzynski
(74) *Attorney, Agent, or Firm*—Jianq Chyun IP Office

(57) ABSTRACT

An illumination system having a light source, an integration rod and a color wheel is provided. The light source is suitable for providing a light beam. The light integration rod and the color wheel are disposed in the transmission path of the light beam. The color wheel is disposed between the light source and the light integration rod. The light integration rod has a light input end adjacent to the color wheel and a light output end opposite the light input end. The light integration rod has two indentations at the light input end to form an airflow channel. The noise caused by the rotating color wheel is reduced through the airflow channel.

8 Claims, 7 Drawing Sheets

ILLUMINATION SYSTEM

CROSS-REFERENCE TO RELATED APPLICATION

This application claims the priority benefit of Taiwan application serial no. 94146679, filed on Dec. 27, 2005. All disclosure of the Taiwan application is incorporated herein by reference.

BACKGROUND OF THE INVENTION

1. Field of the Invention

The present invention relates to an illumination system. More particularly, the present invention relates to an illumination system that reduces noise in a projector.

2. Description of Related Art

FIG. 1 is a schematic cross-sectional view showing a conventional disposition of a color wheel and a light integration rod. FIG. 2 is a perspective view of a conventional light integration rod. As shown in FIGS. 1 and 2, the light integration rod 110 within the illumination system must be positioned as close to the color wheel 120 as possible to increase the optical effect and quality. However, the color wheel 120 spinning at high speed (for example, up to 10800 RPM) generates considerable noise.

The noise has two major sources. One of the sources is the noise originated by the spinning color wheel 120. This type of noise can be reduced through dynamic balancing or using an air-bearing motor. Another source is the noise caused by the wind shear as the color wheel 120 rotates. More specifically, in a conventional color wheel 120, due to the dimensional tolerance of various filters 122 and the assembling tolerance when the filters 122 are mounted to the motor 124, the light output surface of various filters 122 (the surface adjacent to the light integration rod 110) may not be in the same surface. Hence, a gap G is formed between a portion of the filters 122 and the motor 124. Therefore, as the color wheel 120 rotates, a large cyclic pressure variation occurs in the space between the filter 122 and the light integration rod 110, thereby generating the so-called wind shear. Furthermore, the wind shear may cause some resonance inside the light integration rod 110 and intensify the noise problem.

Furthermore, in a conventional light integration rod 110, a width D1 of a first panel 112a or a second panel 112b is greater than a width D2 of a third panel 114a or a fourth panel 114b. In other words, the distance separating the first panel 112a from the second panel 112b is smaller than the distance separating the third panel 114a from the fourth panel 114b. Thus, the number of light reflections between the first panel 112a and the second panel 112b is greater than the number of light reflections between the third panel 114a and the fourth panel 114b. As a result, a light beam 130 incident on the light integration rod 110 emerges with a lesser degree of uniformity. Ultimately, the image projected from the projector has a poor quality.

SUMMARY OF THE INVENTION

Accordingly, one objective of the present invention is to provide an illumination system capable of reducing the noise in an operating projector.

To achieve these and other advantages and in accordance with the purpose of the invention, as embodied and broadly described herein, the invention provides an illumination system comprising a light source, a light integration rod and a color wheel. The light source is suitable for providing a light beam. The light integration rod and the color wheel are disposed in a transmission path of the light beam. The color wheel is disposed between the light source and the light integration rod. In addition, the light integration rod has a light input end adjacent to the color wheel and a light output end opposite the light input end. The light integration rod has two indentations at the light input end to form an airflow channel.

The present invention also provides an alternative illumination system comprising a light source, a light integration rod and a color wheel. The light source is suitable for providing a light beam. The light integration rod and the color wheel are disposed in a transmission path of the light beam. The color wheel is disposed between the light source and the light integration rod. In addition, the light integration rod has a light input end adjacent to the color wheel and a light output end opposite the light input end. Furthermore, a normal vector to an optical cut surface of the light integration rod at the light input end is not in parallel to the optical axis of the light integration rod.

The present invention also provides an illumination system having a light source, a light integration rod and a color wheel. The light source is suitable for providing a light beam. The light integration rod and the color wheel are disposed in a transmission path of the light beam. The color wheel is disposed between the light source and the light integration rod. In addition, the color wheel includes a motor and a plurality of filters mounted on the motor. Moreover, the light output surfaces of the filters are disposed in a same surface.

The light input end of the light integration rod in the present invention has an airflow channel, wind shear resulting from the rotating color wheel is reduced so that less noise is produced when the projector is in operation. In addition, the light output surfaces of all the filters in the color wheel fall in the same surface. Hence, the noise produced by the wind shear when the color wheel is in operation is further minimized.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
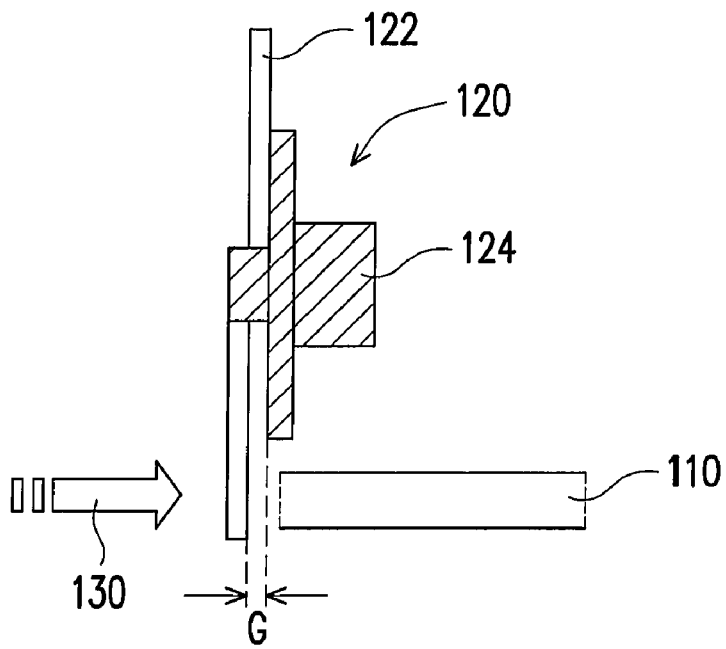
FIG. 1 is a schematic cross-sectional view showing a conventional color wheel and a conventional light integration rod.
Figure 2:
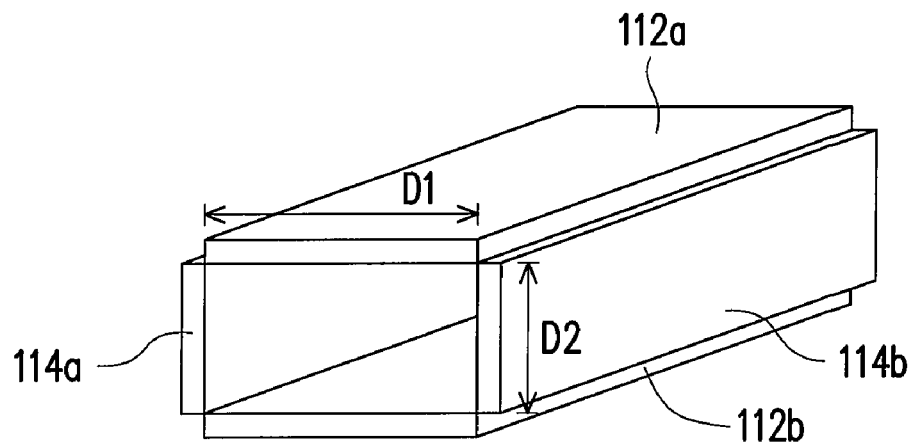
FIG. 2 is a perspective view of the conventional light integration rod in FIG. 2.

Reference will now be made in detail to the present preferred embodiments of the invention, examples of which are illustrated in the accompanying drawings. Wherever possible, the same reference numbers are used in the drawings and the description to refer to the same or like parts.

Figure 3:
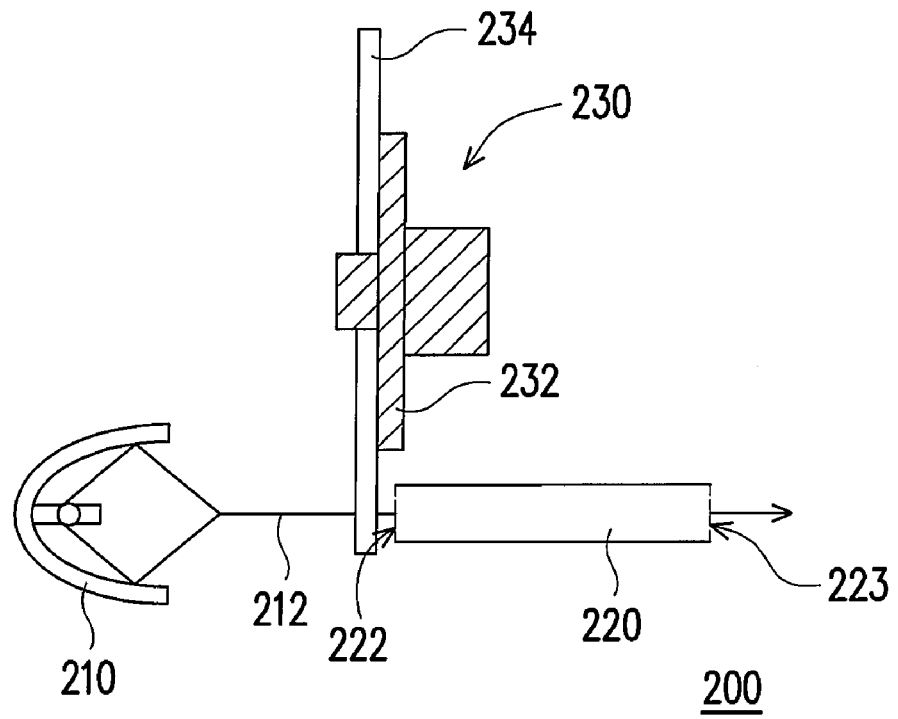
FIG. 3 is a schematic cross-sectional view of an illumination system according to a first embodiment of the present invention.
Figure 4:
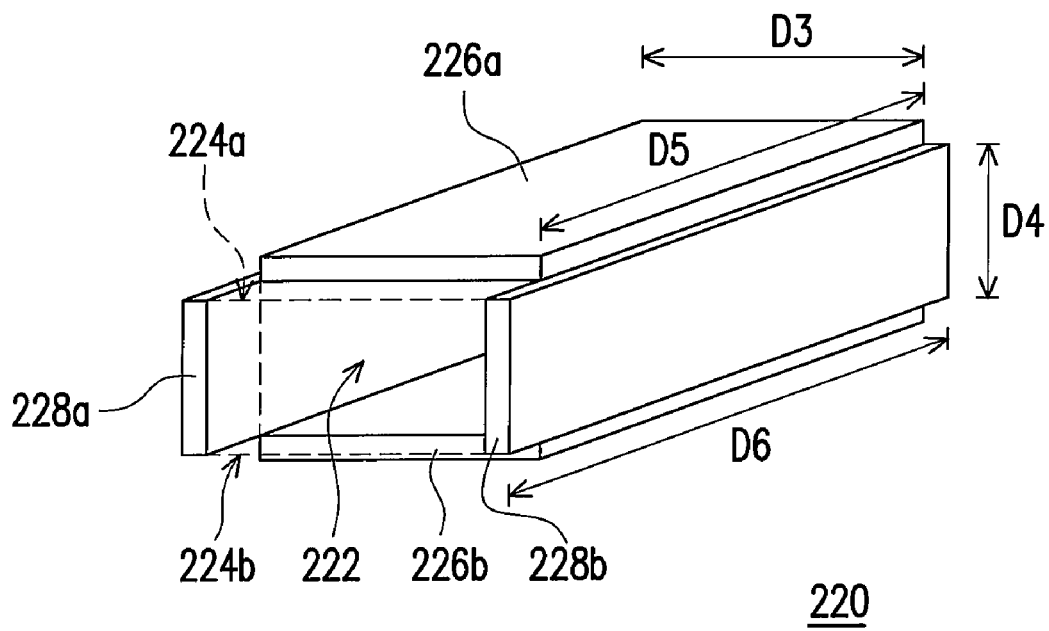
FIG. 4 is a perspective view of the light integration rod in FIG. 3.

As shown in FIGS. 3 and 4, an illumination system 200 according to a first embodiment of the present invention includes a light source 210, a light integration rod 220 and a color wheel 230. The light source 210 is suitable for providing a light beam 212. The light integration rod 220 and the color wheel 230 are disposed on in a transmission path of the light beam 212. The color wheel 230 is disposed between the light integration rod 220 and the light source 210. The light integration rod 220 has a light input end 222 and a light output end 223 on the other side such that the light input end 222 of the light integration rod 220 is adjacent to the color wheel 230. Furthermore, the light input end 222 of the light integration rod 220 has two indentations 224a and 224b that form an airflow channel.

The aforementioned light integration rod 220 comprises a pair of opposing panels including a first panel 226a and a second panel 226b and another pair of opposing panels including a third panel 228a and a fourth panel 228b. The third panel 228a and the fourth panel 228b are connected between the first panel 226a and the second panel 226b. The first panel 226a and the second panel 226b retreat inward at the light input end 222 of the light integration rod 220 between the third panel 228a and the fourth panel 228b to form the two indentations 224a and 224b. Furthermore, in the light integration rod 220, a width D3 of the first panel 226a is the same as a width of the second panel 226b. A width D4 of the third panel 228a is the same as a width of the fourth panel 228b. The width D3 is greater than the width D4.

Figure 5:
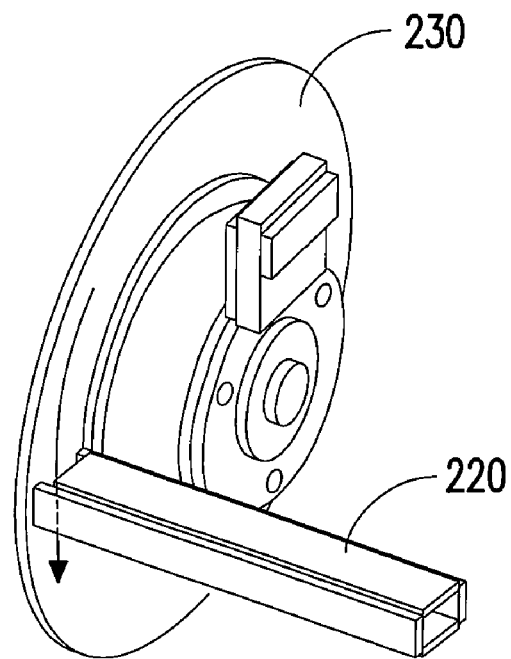
FIG. 5 is a perspective view showing the airflow direction between the color wheel and the light integration rod in FIG. 3.

Referring to FIGS. 4 and 5, due to the presence of an airflow channel in the light integration rod 220, the air current produced by the rotating color wheel 230 flows in the direction indicated by the arrow in FIG. 5. As a result, the rapid pressure variation produced by the rotating color wheel 230 is reduced so that the local airflow is smoother and turbulence and eddies resulting from a turbulent flow (caused by pressure fluctuation) are significantly minimized. Therefore, the airflow channel in the light integration rod 200 reduces the wind shear resulting from the rotating color wheel 230 so that a lowering of the noise level is achieved.

It should be noted that a length D5 of the first panel 226a is the same as the width of the second panel 226b, and a length D6 of the third panel 228a is the same as the width of the fourth panel 228b. The width D5 is smaller than the width D6. Thus, the number of reflections of light between the first panel 226a and the second panel 226b is close to the number of reflections of light between the third panel 228a and the fourth panel 228b. Consequently, after the light beam 212 has passed through the light integration rod 212, the emerging light beam has a higher degree of uniformity to improve the quality of projected image from a projector.

Figure 6:
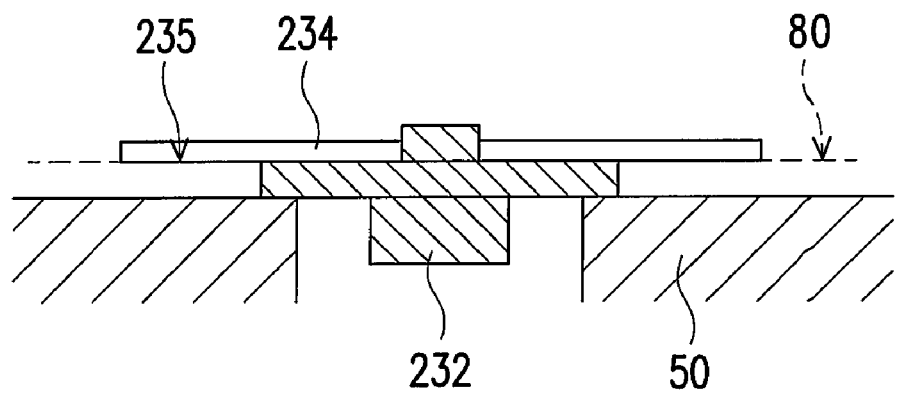
FIG. 6 is a schematic cross-sectional view illustrating the assembling of the color wheel in FIG. 3.

To reduce the wind shear noise produced by the rotating color wheel 230 further, the process of assembling the color wheel 230 includes placing the motor on a fixture 50 and using the surface 80 as a reference surface for the assembly as shown in FIG. 6. In this way, the light output surfaces 235 of the filters 234 fall in the same surface. Therefore, the planarity between various filters 234 in the color wheel 230 is substantially improved so that the amount of turbulence and eddies caused by unevenly joined filters 234 are minimized. Ultimately, the noise problem is further improved.

Figure 7A:
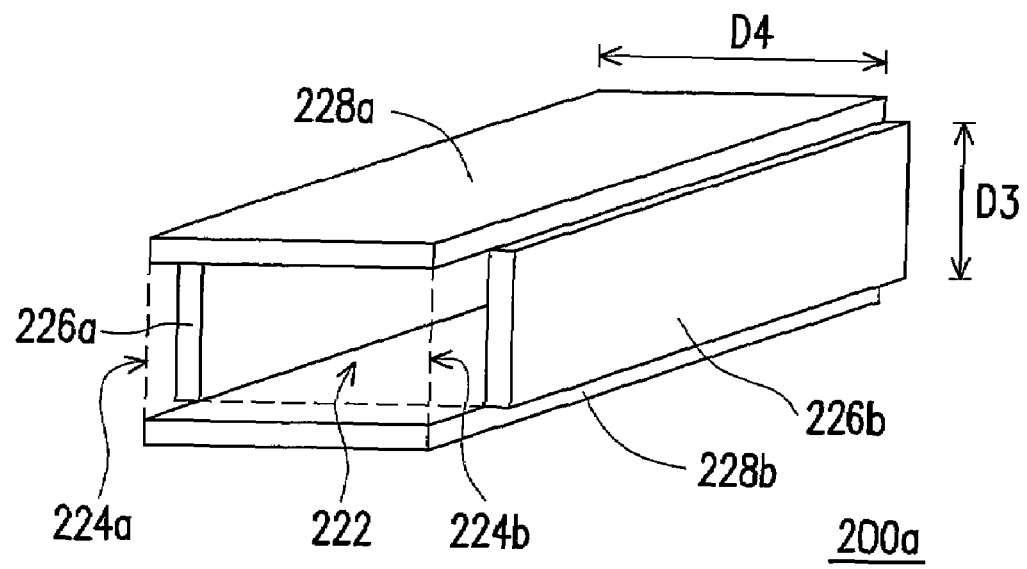
FIG. 7A is a perspective view of a light integration rod according to a second embodiment of the present invention.
Figure 7B:
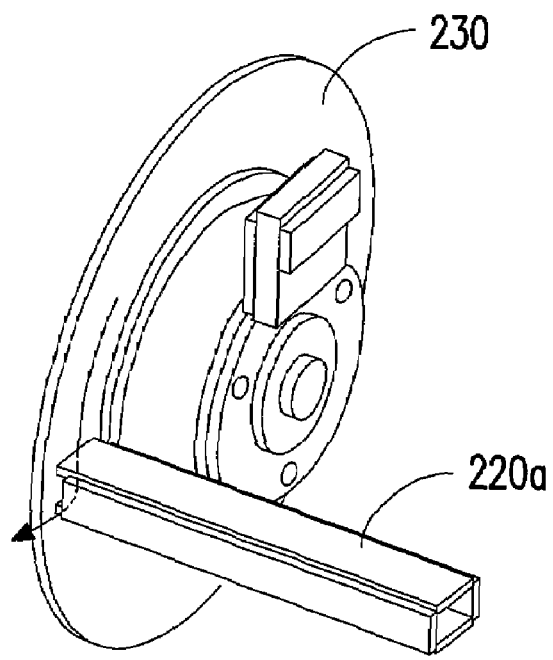
FIG. 7B is a perspective view showing the airflow direction between the color wheel and the light integration rod in FIG. 7A.

As shown in FIGS. 7A and 7B, a light integration rod 220a in a second embodiment of the invention includes a first panel 226a, a second panel 226b, and a third panel 228a and a fourth panel 228b connected between the first panel 226a and the second panel 226b. A width D3 of the first panel 226a is the same as the width of the second panel 226b, and a width D4 of the third panel 228a is the same as the width of the fourth panel 228b. The width D3 is smaller than the width D4. Furthermore, the first panel 226a and the second panel 226b retreats inward at the light input end 222 of the light integration rod 220a between the third panel 228a and the fourth panel 228b to form two indentations 224a and 224b.

The indentations 224a and 224b in the aforementioned light integration rod 220a form an airflow channel at the light input end 222. Thus, the air current produced by the rotating color wheel 230 flows in a direction indicated by the arrow in FIG. 7B. Ultimately, the amount of turbulence and eddies is minimized and the wind shear noise level is lowered.

As shown in FIGS. 8A through 8E, a light integration rod 220b in a third embodiment has a first light input end 222 and a second light output end 223 on the other side. The light input end 222 is adjacent to the color wheel 230. A normal vector N1 to the optical cut surface of the light integration rod 220b at the light input end 222 is not in parallel to the optical axis C of the light integration rod 220b. More specifically, the light integration rod 220b comprises a pair of opposing panels including a first panel 226a and a second panel 226b and another pair of opposing panels including a third panel 228a and a fourth panel 228b. The third panel 228a and the fourth panel 228b are connected between the first panel 226a and the second panel 226b. Furthermore, a width D3 of the first panel 226a is the same as the width of the second panel 226b, and a width D4 of the third panel 228a is the same as the width of the fourth panel 228b. The width D3 is greater than the width D4. Moreover, a normal vector N2 to the surface 227a of the first panel 226a at the light input end 222 and another normal vector N3 to the surface 227b of the second panel 226b at the light input end 222 are parallel to the normal vector N1 to the optical cut surface at the light input end 222.

Because the closer is the location of the surface 227a of the first panel 226a and the surface 227b of the second panel 226b to the fourth panel 228b the further away it is from the color wheel 230, a larger gap exists between the first panel 226a and the color wheel 230 and between the second panel 226b and the color wheel 230. Therefore, an airflow channel is formed so that an air current flows in a direction indicated by the arrows in FIG. 8D or FIG. 8E to reduce the amount of turbulence and eddies when the color wheel 230 is spinning at a very high speed. As a result, the wind shear noise level is reduced.

Figure 8A:
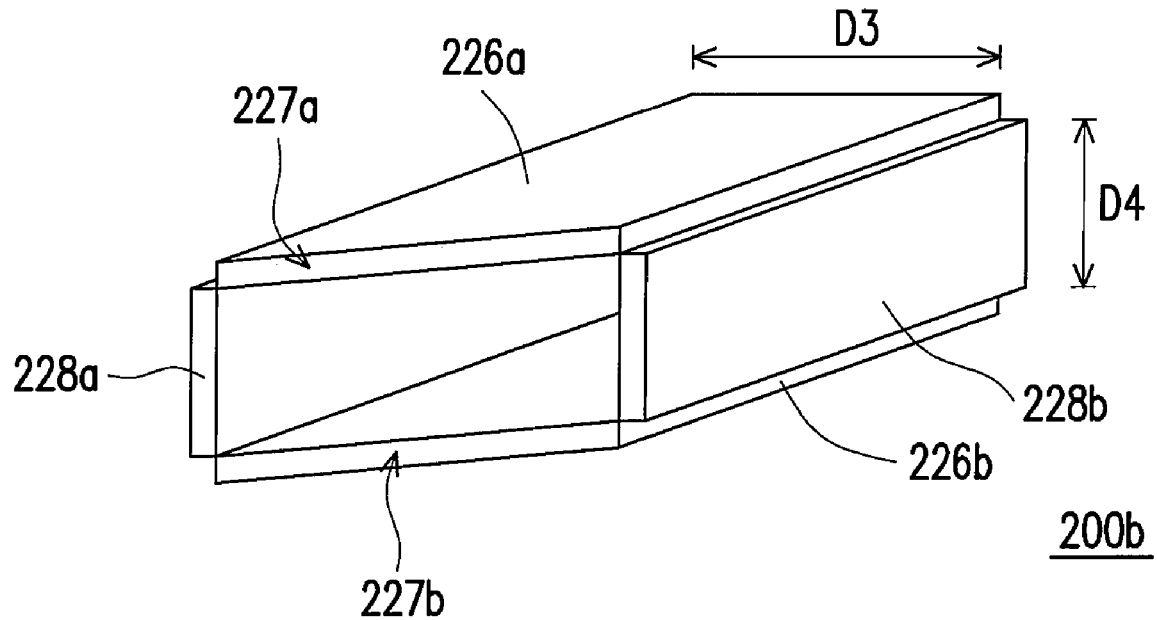
FIG. 8A is a perspective view of a light integration rod according to a third embodiment of the present invention.
Figure 8B:
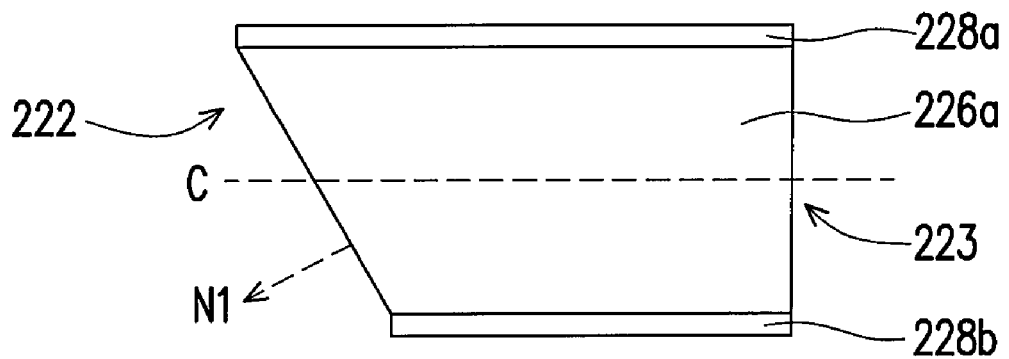
FIG. 8B is a top view of the light integration rod in FIG. 8A.
Figure 8C:
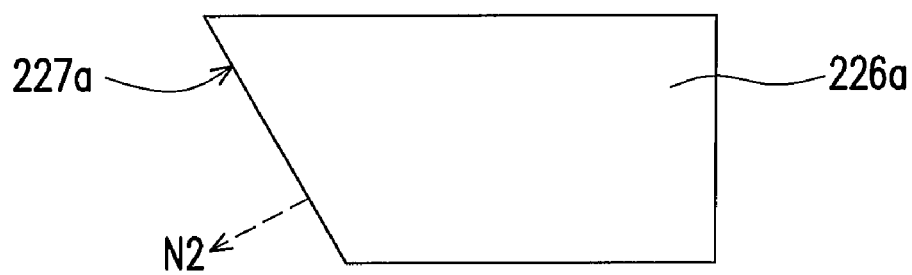
FIG. 8C is a top view of a first panel and a second panel of the light integration rod in FIG. 8A.
Figure 8C:
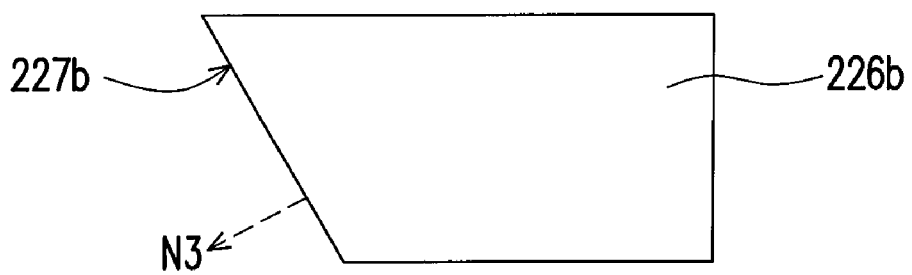
Figure 8D:
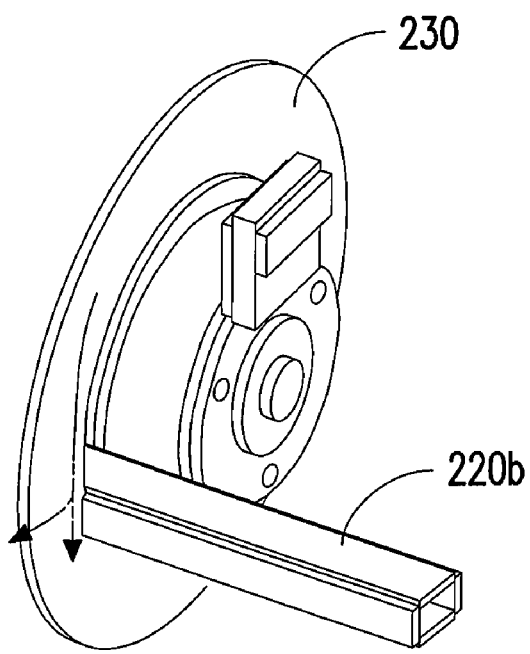
FIGS. 8D and 8E are perspective views showing the airflow directions between the color wheel and the light integration rod in FIG. 8A.
Figure 8E:
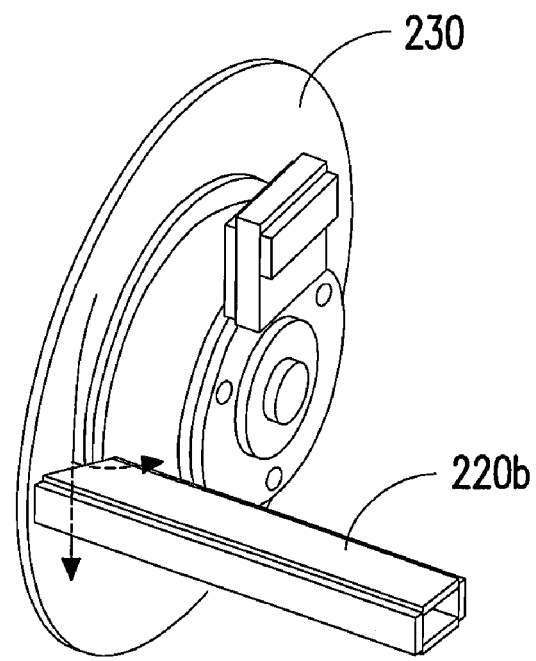
Figure 9:
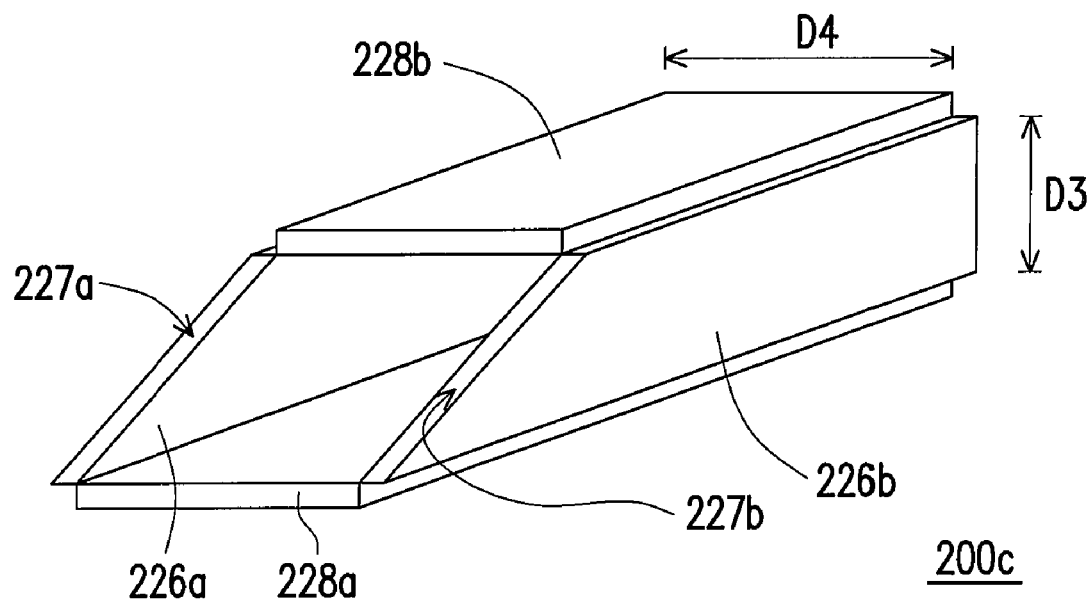
FIG. 9 is a perspective view of a light integration rod according to a forth embodiment of the present invention.

As shown in FIG. 9, a light integration rod 220c in a forth embodiment is similar to the light integration rod 220b in FIG. 8A. The main difference is that a width D3 is smaller than a width D4, which the width D3 of the first panel 226a is the same as the width of the second panel 226b of the light integration rod 220c, and the width D4 of the third panel 228a is the same as the width of the fourth panel 228b. Similar to the light integration rod 220b, a larger gap exists between the first panel 226a of the light integration rod 220c and the color wheel 230 and between the second panel 226b of the light integration rod 220c and the color wheel 230. Hence, an airflow channel is formed that reduces the amount of turbulence and eddies when the color wheel 230 is spinning at a very high speed. As a result, the wind shear noise level is also reduced. In summary, the illumination system and its light integration rod in the present invention has at least the following advantages:

1. The light input end of the light integration rod has an airflow channel capable of reducing the pressure fluctuation when the color wheel is spinning at a very high speed so that a smoother air flow is produced. Therefore, the invention reduces the wind shear noise level caused by the rotating color wheel and hence resolves the noise problem of an operating projector.

2. In one embodiment, the light output surfaces of the filters in the color wheel fall in the same surface so that the amount of turbulence and eddies caused by the unevenly joined filters when the color wheels rotates at a very high speed is minimized. Consequently, the noise problem is improved.

3. In another embodiment, the first panel and the second panel of the light integration rod having a greater width retreat inward from the third panel and the fourth panel having a smaller width. Aside from forming an airflow channel, this resulting configuration narrows down the difference between the number of light reflections between the first panel and the second panel and the number of light reflections between the third panel and the fourth panel. Thus, the light beam emerging from the light integration rod is more uniform and the image projected by the projector has a better display quality.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An illumination system, comprising:
a light source suitable for providing a light beam;
a light integration rod disposed in a transmission path of the light beam, the light integration rod having a light input end and a light output end opposite the light input end, and the light input end of the light integration rod having two indentations, the two indentations forming an airflow channel, the light integration rod comprising:
a pair of opposing panels including a first panel and a second panel; and
another pair of opposing panels including a third panel and a fourth panel, wherein the third panel and the fourth panel are connected between the first panel and the second panel, and the first panel and the second panel retreat inward at the light input end of the light integration rod between the third panel and the fourth panel to form the indentations; and
a color wheel disposed between the light source and the light integration rod in the transmission path of the light beam, the light input end of the light integration rod being adjacent to the color wheel.

2. The illumination system of claim 1, wherein a width of the first panel is the same as a width of the second panel, a width of the third panel is the same as a width of the fourth panel, and the width of the first panel is smaller than the width of the third panel.

3. The illumination system of claim 1, wherein a width of the first panel is the same as a width of the second panel, a width of the third panel is the same as a width of the fourth panel, and the width of the first panel is greater than the width of the third panel.

4. The illumination system of claim 1, wherein the color wheel includes:
a motor; and
a plurality of filters mounted on the motor, the light output surfaces of the filters being disposed in a same surface.

5. An illumination system, comprising:
a light source suitable for providing a light beam;
a light integration rod disposed in a transmission path of the light beam, the light integration rod having a light input end and a light output end opposite the light input end, and a normal vector to an optical cut surface at the light input end being not in parallel to an optical axis of the light integration rod, the light integration rod comprising:
a pair of opposing panel including a first panel and a second panel; and
another pair of opposing panel including a third panel and a fourth panel, wherein the third panel and the fourth panel are connected between the first panel and the second panel, and a normal vector to the surface of the first panel at the light input end and a normal vector to the surface of the second panel at the light input end are parallel to the normal vector to the optical cut surface at the light input end; and
a color wheel disposed between the light source and the light integration rod in the transmission path of the light beam, the light input end of the light integration rod being adjacent to the color wheel.

6. The illumination system of claim 5, wherein a width of the first panel is the same as a width of the second panel, a width of the third panel is the same as a width of the fourth panel, and the width of the first panel is smaller than the width of the third panel.

7. The illumination system of claim 5, wherein a width of the first panel is the same as a width of the second panel, a width of the third panel is the same as a width of the fourth panel, and the width of the first panel is greater than the width of the third panel.

8. The illumination system of claim 5, wherein the color wheel includes:
a motor;
a plurality of filters mounted on the motor, the light output surfaces of the filters being disposed in a same surface.

* * * * *